United States Patent [19]
Tothill

[11] 3,757,052
[45] Sept. 4, 1973

[54] TELEPHONE LINE EXTENDER WITH TEST-THRU CAPABILITY

[75] Inventor: Gordon R. Tothill, Chatham, Ontario, Canada

[73] Assignee: Electro Dynamics & Telecom, Ltd., Ontario, Canada

[22] Filed: Oct. 19, 1971

[21] Appl. No.: 190,533

[52] U.S. Cl. .......................... 179/16 F, 179/175.31 R
[51] Int. Cl. .......................... H04m 3/24, H04b 3/36
[58] Field of Search ...................... 179/16 E, 16 EA, 179/16 EC, 16 F, 175.31 R

[56] References Cited

UNITED STATES PATENTS

| | | | |
|---|---|---|---|
| 3,660,609 | 5/1972 | Tremblay et al. | 179/16 F |
| 3,504,127 | 3/1970 | Slana | 179/16 F |
| 3,639,696 | 2/1972 | Chambers, Jr. | 179/16 F |
| 3,339,027 | 8/1967 | Feiner et al. | 179/16 F |
| 3,514,543 | 5/1970 | Rae | 179/16 F |

*Primary Examiner*—Kathleen H. Claffy
*Assistant Examiner*—Randall P. Myers
*Attorney*—C. Frederick Leydig, Richard L. Voit et al

[57] ABSTRACT

A line, or loop, extender for a telephone system which is intended for connection in the tip and ring lines of a remotely located telephone set thereby to increase the line current to a level capable of more reliable operation of relays and the like in the central office switching equipment. A diversion relay is provided having contacts interposed between the line extender and the lines so connected that when the relay is in a first state the line extender is connected in series with the lines and so that when the relay is in its opposite state corresponding lines are connected together to form a metallic by-pass around the line extender completely isolated from the latter to establish a standard condition for the making of tests upon the lines. In the preferred embodiment the bridging relay is caused to be in its normal state during ringing to provide a "metallic" i.e., directly connected ringing circuit. A current detecting relay in the subscriber's lines is connected to the diversion relay so that when the receiver is raised at the subscriber's telephone set the line extender is connected into the circuit to raise the current to a reliable level. For purposes of isolation the current detecting relay preferably consists of a light-emitting diode plus photocell.

11 Claims, 4 Drawing Figures

TELEPHONE LINE EXTENDER WITH TEST-THRU CAPABILITY

In a typical telephone system the lines leading to a subscriber's telephone set are designated as "tip" and "ring" lines. Voltage is applied to these lines by a battery in the telephone exchange, or central office. When the subscriber's receiver is "on the hook", that is, when the telephone is idle, application of a "ringing" signal of relatively high alternating voltage causes the bell to ring at the telephone set. When the subscriber takes the telephone "off the hook" a direct current loop is established which includes relays at the central office as well as the battery at the central office. Such relays are current-critical devices, requiring a reasonably high minimum current to achieve reliable pull-in. Where the lines leading to the subscriber's set are of light gauge and where the subscriber is located at some distance from the central office, the total resistance in the loop circuit may be sufficient to reduce the current to a non-reliable level. Consequently, it has been proposed to provide a so-called "line extender" or "loop extender" having a source of auxiliary voltage which is connected in series, additively, with the battery at the central office resulting in a voltage which is sufficiently high to produce reliable current flow. For example, where the battery at the central office has a voltage which is on the order of 48 volts, an auxiliary direct voltage on the order of 12 to 24 volts may be used. Because of the fact that the polarity of the central office battery is often intended to be reversed, either for supervisory signalling or during completion of a telephone call, means have been provided for sensing the battery voltage and for automatically applying the auxiliary voltage in additive relation.

While the objective of a line extender may be succinctly stated, practical usage has raised a number of serious operating problems. For example, where a system is being routinely checked out, either manually or by use of automatic equipment, the presence of the line extender tends to make the readings which are taken largely meaningless. Moreover, such devices, while providing the desired auxiliary voltage, have tended to degrade line performance, particularly on party lines, where a ringing signal sent out on one of the lines may cause unwanted ringing of a telephone which is connected, for ringing purposes, to the opposite line.

Accordingly, it is an object of the present invention to provide an improved line extender circuit which is normally effective to provide an auxiliary voltage of proper polarity but which includes provision for forming a bridging circuit in which the line extender components are completely isolated from the lines for routine testing. It is a closely related object to provide a line extender in which a diversion relay is provided having contacts which are capable of connecting the line extender into the telephone loop circuit when the relay is in a first state and for establishing a "metallic" by-passing circuit, completely isolated from the line extender components, when the relay is in its opposite or diversionary state. Because of the isolation thus provided through the "metallic" connection, there is no path over which a ringing signal, applied by the central office to one of the lines, can pass from one line to the other to produce unwanted ringing of a telephone on the second line.

It is another object of the present invention to provide a line extender circuit which isolates the tip and ring lines during ringing of the receiving telephone and which automatically energizes the source of auxiliary voltage with proper polarity to increase to a reliable level the current flowing in the loop circuit when the receiver of the telephone set is raised from the hook. More specifically, it is an object to provide in the tip and ring lines a current detecting relay which detects the flow of current caused by lifting the receiver from the hook and which is connected to the diversionary relay for energizing the latter to effect switching from the bridging state to a second state in which the auxiliary source of voltage is effectively connected in series with the telephone lines for more reliable operation of the relays in the central office switching equipment.

It is an object of the invention in one of its aspects to provide logic circuitry between the current detecting relays and the diversionary relay to enable operation of the latter by either one of the current detecting relays and with provision for overridingly switching the diversionary relay into the diversionary or bridging state prior to routine testing of the lines.

Other objects and advantages of the invention will be apparent from the following detailed description taken in conjunction with the accompanying drawings, in which.

Figure 1:
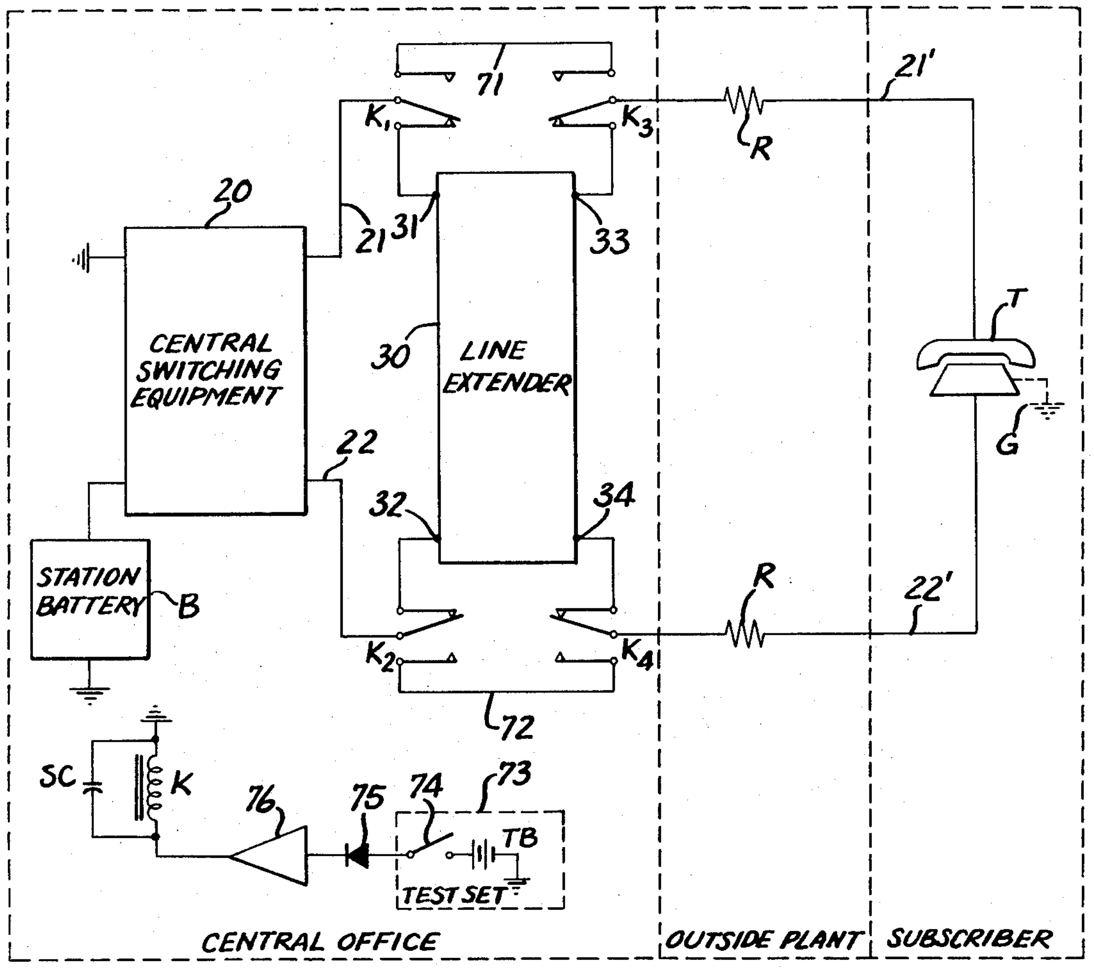
FIG. 1 is a simplified block diagram showing a subscriber loop in a telephone system for connecting a remotely located subscriber station to the central office switching equipment, including a line extender circuit and a diversion switching arrangement constructed in accordance with the present invention.
Figure 2:
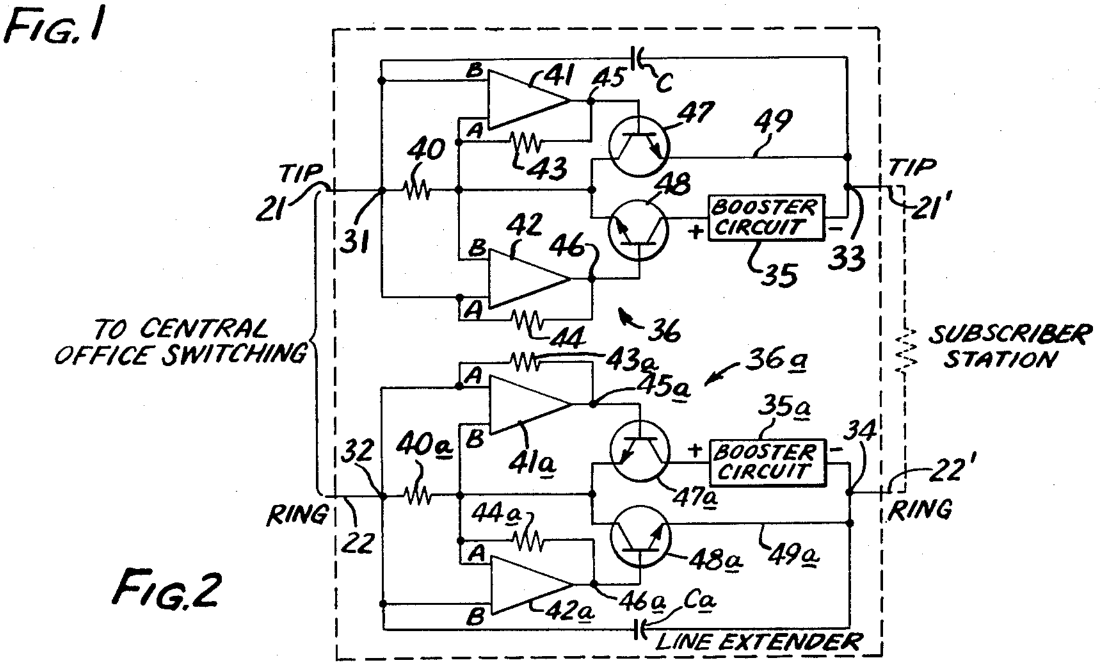
FIG. 2 is a schematic diagram showing one embodiment of a circuit used in the line extender of FIG. 1.
Figure 4:
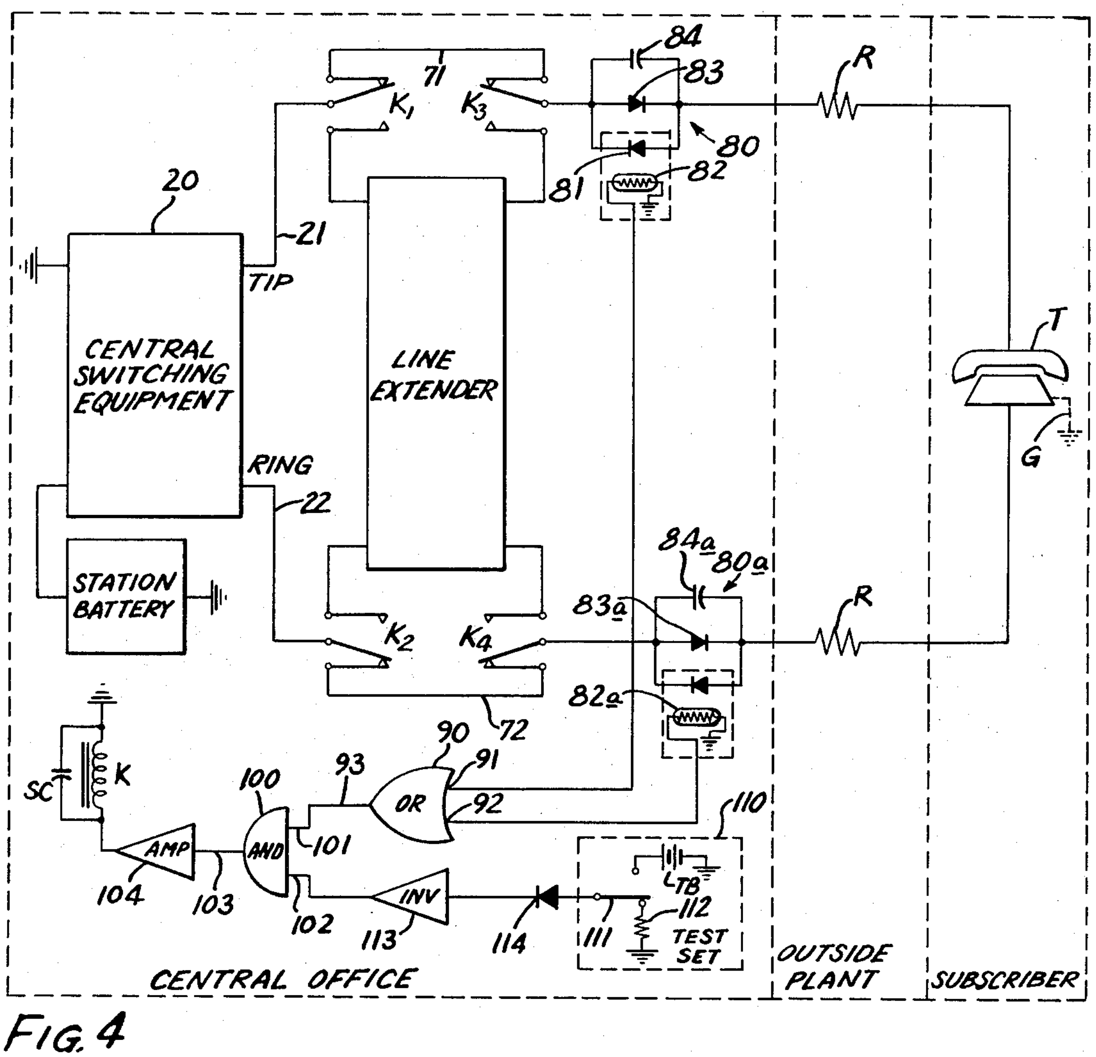
Figure 3:
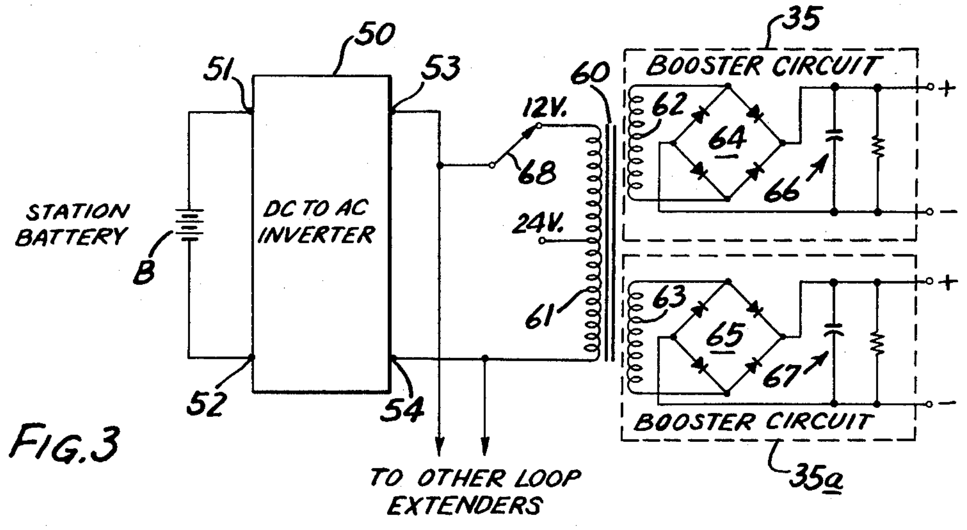

FIG. 3 is a schematic diagram of a power source for providing auxiliary direct voltage for use in the line extender circuit shown in FIG. 2; and FIG. 4 is a simplified block diagram similar to FIG. 1 but including a preferred embodiment of the diversion switching arrangement, including a "metallic" ringing path for by-passing the line extender circuit when the subscriber's receiver is "on the hook."

While the invention is susceptible to various modifications and alternative forms, several illustrative embodiments have been shown in the drawings which will be described herein. It should be understood, however, that it is not intended to limit the invention to the particular form disclosed, but on the contrary, the intention is to cover all modifications, equivalents and alternatives falling within the spirit and scope of the invention as defined in the appended claims.

Turning now to the drawings there is shown in FIG. 1, in diagrammatic form, a typical system utilizing the present invention. The switching equipment conventionally included in a telephone central office is indicated generally at 20 powered by a station battery B which is normally kept floating upon a charger which has a terminal voltage, with charger inactive, of 48 volts. The lines leading to a particular subscriber's telephone set, and which are conveniently referred to as "tip" and "ring" lines are indicated at 21, 22. In a conventional system the lines 21, 22 proceed, as indicated at 21′, 22′, to "tip" and "ring" connections on a subscriber's telephone set T. The line resistance is indicated at R.

It will be understood that the switching equipment 20 is conventional including relays for connecting the subscriber's telephone to other telephones in the system as well as means for applying to a selected one of the lines 21, 22 a high-voltage alternating signal for ringing purposes which is effective to cause ringing in the telephone set when the set is in the "on hook" condition. To complete the ringing circuit a ground return G is provided.

When the subscriber takes the receiver "off the hook," contact is made within the telephone set causing current to flow in a loop circuit formed by the lines 21,22 to close an appropriate relay within the central switching equipment for initiating the call. It is apparent that where the line resistance R is excessive the amount of current which flows in the loop may be below that required to produce positive actuation of the central office relays.

Accordingly, a "line extender" or "loop extender" 30 is provided having a first set of terminals 31, 32 intended for connection to the central switching equipment and a second pair of terminals 33, 34 leading to the subscriber's telephone set. Within the line extender, and interposed between the terminals 31, 33 is a source of auxiliary direct voltage, conveniently referred to as a "booster circuit" 35, together with switching circuitry 36 for selectively connecting the booster, with proper polarity, into the subscriber's loop circuit. It will be understood that while the station or central office battery B has a definite polarity, means will frequently be provided in the central switching equipment for causing the polarity applied to the lines 21, 22 to be reversed, either for supervisory signaling purposes (to actuate equipment not shown) or incident to completion of a telephone call, either on a "wink-back" or steady state basis. Each line 21, 22 is provided with its own source of auxiliary voltage, with the sources being selectively activated depending upon the applied station battery polarity. The alternate booster circuit is indicated at 35*a* and the associated polarity detecting and switching circuitry is indicated at 36*a*, with corresponding reference numerals being employed for the two auxiliary voltage sources, using the subscript *a* where applicable.

Referring to the polarity detecting and switching circuit 36 of FIG. 2 it includes an input resistor 40 and Schmitt trigger circuits 41, 42 having respective feedback resistors 43, 44. The output terminals 45, 46 are respectively connected to switches in the form of transistors 47, 48. A Schmitt trigger is a device well known in the art in which a certain relative potential across the input terminals is effective to produce an output signal for control purposes, while the reverse relative potential is ineffective to produce an output signal. The design of such devices may vary widely and reference is made for further details to conventional sources. In the present instance it is assumed that the trigger device 41 is so constructed that when the input terminal B thereof is relatively more positive than the terminal A, a positive output signal of reliably high level will be produced at the output terminal 45.

To understand the operation of the circuit it may be assumed that the applied polarity of the station battery B is such as to produce a positive voltage on terminal 31 and a negative voltage on terminal 32. Because of the drop through the input resistor 40 a voltage will be applied to terminal B of the trigger device which is more positive than that applied to terminal A, causing a positive voltage to exist at output terminal 45 resulting in conduction through the transistor 47 via line 49 to the output terminal 33. Referring to the alternate trigger device 42, the same battery potential will cause its input terminal B to have a potential which is less positive than terminal A, which results in no control voltage at output terminal 46 so that transistor 48 remains in the "off" condition. As a result, the booster 35 remains inactive.

However, turning attention to the lower portion of the circuit, application of negative voltage to the input terminal 32 causes a voltage drop through input resistor 40*a* in a direction to make the voltage at terminal B of trigger device 41*a* more positive than that at terminal A resulting in a positive output voltage at terminal 45*a*, making transistor 47*a* conductive. This switches the booster 35*a* into the circuit in series adding relation with the existing polarity of the station battery so that the total voltage in the loop is increased to a level which insures a reliably high loop current.

In the event that the polarity of the station battery B is reversed, causing the positive voltage to be applied to the terminal 31 and a negative voltage to the terminal 32, the effect is to switch the lower booster 35a out of the circuit and the upper booster 35 into the circuit. This can be verified by considering the effect of a negative voltage at terminal 31. The voltage applied to the input of the trigger 41, being reversed, open-circuits the transistor 47 so that the line 49 no longer conducts. Conversely, reversing the voltage to the input terminals of the trigger 42, making terminal B more positive than A, produces a positive control signal at terminal 46 making the transistor 48 conductive and connecting the booster circuit 35 additively in series with the station battery. At the same time, application of positive voltage to terminal 32 causes terminal B of the trigger device 41*a* to be negative relative to terminal A so that the transistor 47*a* is turned off, removing the booster 35*a* from the circuit. The trigger device 42*a*, on the other hand, with the reversal of polarity, produces a positive control voltage which is applied to the transistor 48*a*, making the line 49*a* effective, thereby to complete a conductive circuit between terminals 32,34.

In the above discussion it has been assumed that the booster circuits 35, 35*a* comprise sources of direct voltage of the indicated polarity without stating how such voltage is obtained. Referring to FIG. 3, which shows a typical voltage source 35, it will be seen that the direct voltage is produced using the station battery B as a source of energy. The battery voltage is fed to a DC-to-AC inverter 50 having input terminals 51,52 and output terminals 53,54. The details of the inverter are not shown and it will be understood that the unit is of conventional type, commercially available. The alternating voltage appearing at the terminals 53,54 is applied to a transformer 60 having a primary winding 61 and secondary windings 62,63, the windings having associated bridge rectifiers 64,65 and filter circuits 66, 67 respectively. The effect is to produce a direct output voltage at the terminals of the booster units 35, 35*a* of the polarity indicated and of a voltage which may either be 12 volts or 24 volts DC depending upon the setting of a selector switch 68 associated with the transformer primary.

In accordance with the invention the line extender 30 is connected into the loop circuit 21,22, not permanently, but via the contacts of a relay in such a way that when the relay is in one of its two possible states the contacts connect the terminals, 31,33 of the line extender in series with the upper or "tip" line 21 and connect the lower terminals 32,32 in series with the "ring" line 22, but when the relay is in its opposite state the contacts are effective to establish by-passing connections. Specifically, when the relay is in its opposite state, the sections 21,21' of the "tip" line are directly connected together, completely isolated from the line extender terminals 31,33, and the sections 22,22' of the "ring" line are directly interconnected and free of the line extender terminals 33,34. The direct connections thus provided are referred to, for convenience, as "metallic" connections which not only implies a low-resistance contact but isolation which is sufficiently complete so that the loop circuit operates as though the line extender had been completely removed. More specifically, in accordance with the invention, I provide a diversion relay K having four sets of single-pole, double-throw contacts which have been indicated at K1-K4 inclusive and which are associated with correspondingly numbered terminals of the line extender. Indeed, the contacts K1, K2 are effectively interposed between the terminals of the switching equipment 20 and the line extender 30 and the contacts K3,K4 are effectively interposed between the terminals 33, 34 of the line extender and the subscriber's telephone set.

Taking the single-pole, double-throw contacts K1 by way of example, it will be apparent that the contacts include a central movable "pole" and alternatively engageable "outside" contacts. It will be understood in FIG. 1 that when the relay K is de-energized the switchable poles are in the illustrated state in which the sets of contacts K1,K3 provide a series circuit with terminals 31,33 of the line extender and sets of contacts K2,K4 provide a series circuit with contacts 32,34. Under such circumstances, in order to complete a ringing circuit through the line extender, the terminals 31,33 are shunted by a capacitor C (see FIG. 2) and the terminals 32, 34 are shunted by a capacitor *Ca*. Thus a ringing signal may be applied to either terminal 21,22 of the central switching equipment and conducted, through the appropriate one of the capacitors, to the telephone set T to provide an audible signal. When the receiver is lifted from the hook, the tip and ring contacts 21', 22' are closed at the telephone set to establish a loop circuit for flow of direct current and with the appropriate booster **35,35*a* being connected in series-adding relationship to boost the total available voltage so that the loop current is at a reliable level. Means are, however, provided for energizing the relay K to provide direct "metallic" by-pass connections about the line extender, and which are isolated from the terminals of the line extender, when it is desired to test the line either manually or routinely using automated equipment. For this purpose the alternate contacts on each of the single-pole, double-throw switches are connected together by direct by-pass connections, such connections being indicated at 71,72 respectively. For energizing the relay coil a source of voltage is provided which may, for example, be a test battery TB in a test set 73 which includes a manual switch 74. An isolating diode 75 may be provided in series with the output and an inverter 76 may or may not be used depending upon the "sense" of the switch 74, keeping in mind that other functions may be simultaneously performed by the test switch. With the test switch 74 "thrown" voltage applied to the relay K causes each of the switches K1–K4 inclusive to switch to its alternate state, thereby completing by-pass circuits simultaneously through connections 71,72. When the tests have been completed, the relay K may be de-energized to restore the poles of the switches to the positions shown in FIG. 1**.

In accordance with a further and important aspect of the present invention, means are provided, associated with the relay K, for establishing "metallic" by-pass connections around the line extender during the ringing condition, as well as for the making of tests, and for causing the relay to transfer to its alternate state automatically when the subscriber lifts the receiver from the hook in order to insure a boosted flow of current for subsequent operation of relays in the central switching equipment. To effect operation of the relay when the receiver is lifted from the hook, current detecting relays are provided in the loop circuit, with the outputs of the relays being controllingly coupled to the relay winding. While a magnetic relay could be employed for current detecing purposes, I prefer to employ, in the upper line, a photoelectric relay 80 having a photodiode 81 and a photocell 82, the photocell being of either the active or passive type but, in any event, producing an output signal when the diode 81 is energized by passage of current. For the purpose of permitting flow of current equally in the opposite direction I provide an oppositely poled diode 83 which is connected in parallel with the first diode and which preferably has an associated capacitor 84 for efficient conduction of a ringing signal. To detect flow of current in the opposite direction, a photoelectric relay **80*a* is used in the lower or "ring" line 22 having a photodiode 81*a*, a photoelectric cell 82*a*, an opposite poled diode 83*a*, and a shunting capacitor 84*a***.

To insure response regardless of which photoelectric diode is actuated, in other words, regardless of which direction the current flows in the loop circuit, an "or" gate 90 is provided having input terminals 91,92 and an output terminal 93. The latter is connected to an "and" gate 100 having input terminals 101, 102 and an output terminal 103 which is coupled by an amplifier 104 to the relay winding.

For the purpose of testing the lines when the receiver is "off hook" and when the line extender would normally be active, a test set 110 is provided having a test battery TB and a single-pole, double-throw switch 111 having an active or test position in which it makes contact with the battery and having a normal or inactive position in which contact is made with a resistor 112 which is grounded. With the switch in the condition shown, zero output voltage is provided. To satisfy the condition of the "and" circuitry, an inverter 113 is used having an isolating diode 114 connected in series. The inverter, under the zero input condition, produces an active output signal which is applied to the input terminal 102 of the "and" gate, making the "and" gate thereafter responsive to a signal received at input terminal 101.

Accordingly, operation of the circuit shown in FIG. 4 is as follows: The relay K in its first, or de-energized, condition causes the poles of the double-throw switches to make direct "metallic" contact through the connections 71,72 while the receiver is "on hook," the line extender being thus completely isolated from the "tip" and "ring" lines. The sending out of a ringing signal from the central switching equipment produces ringing in the telephone set T. When the subscriber lifts the receiver from the hook, contact is made in the telephone set to establish flow of loop current from the station battery. This flow is detected either by the photoelectric relay 80 or the relay 80*a*, depending upon the direction of current flow. The result is to produce a current detection signal at either one or the other of the input terminals of the "or" gate which, in turn, produces a signal at input terminal 101 of the "and" gate, resulting in an output signal which, amplified by the amplifier 104, is applied to the relay winding causing the latter to be turned on and switching all of the poles of the double-throw switches K1–K4 to their alternate condition, thereby connecting the line extender in series with the loop. When connection is made, the polarity detecting circuitry within the line extender automatically goes into action to connect either the source of booster voltage 35 or the source 35a into series-additive relationship in the circuit, depending upon the applied polarity of the station battery. The relay K may be caused to hold in in the face of sudden changes in the polarity of the station battery by shunting it with a capacitor SC.

When the subscriber hangs up the receiver, current in the loop circuit ceases, no further signal is applied to the "or" gate 90 and the relay K reverts to its original state, causing the switches K1–K4 to revert to the condition illustrated in the drawing (FIG. 4) so that any subsequent ringing signal follows a direct "metallic" connection to the subscriber's telephone.

A primary advantage of the arrangement just described is that, due to the by-passing connections 71, 72 and isolation of the lines from the line extender terminals, there is no possibility of spurious coupling or "cross talk" between the lines. Avoidance of spurious coupling is particularly significant in the case where a number of telephones are connected to the same "party" line. In a "party" line it is common for some of the telephones to be rung via the "tip" line to ground while others are rung through the "ring" line to ground, depending upon the connection which is made in the telephone set. There may, for example, be ten telephones on a party line with five telephones, having five different responsive frequencies, being connected to one line while five telephones, with the same responsive frequencies, are connected to the other line. Where the line extender is left in the circuit during ringing there may be sufficient coupling because of the higher voltage nature of the signal, so that a ringing signal sent out on the "tip" line may unwantedly energize a telephone set having the same ringing frequency but which is coupled, for ringing purposes, to the "ring" line. With the isolation provided by the present arrangement, shown in FIG. 4, selective individual ringing is assured.

When it is desired to test the lines with the subscriber's receiver in the "off hook" condition, in which an output signal is produced by the "or" gate 90, the switch 111 in the test set may be switched to the battery-engaging position in which a signal is applied to the input of the inverter 113. By reason of the inversion, no output signal is produced at the terminal 102 of the "and" gate so that the relay is de-energized causing the contacts to remain in the illustrated isolating positions.

While photoelectric current detecting relays 80, 80a in the respective lines have been illustrated and described, it will be apparent that the invention is not limited thereto and that any desired means may be employed, within the scope of the invention, for detecting flow of loop current for actuating the diversion relay K.

The sets of contacts K1–K4 in the relay K can be considered to consist of two double-pole, double-throw switches. The term "relay" as used herein is a general term not limited to use of magnetic or photoelectric relays.

What I claim is:

1. In a telephone circuit for connecting tip and ring lines from central office switching equipment, including a central office battery, to the tip and ring lines of a subscriber's telephone set to form a loop circuit, the combination comprising a line extender having a pair of input terminals providing connection to the central office tip and ring lines and a pair of output terminals providing connection to the tip and ring lines of the subscriber's telephone set, two sources of auxiliary direct voltage in the line extender, means in the line extender for detecting the polarity of the voltage of the central office battery and for automatically connecting one of the sources of auxiliary voltage into the loop in additive relation, relay means including a first set of contacts interposed between the central office tip and ring lines and the input terminals of the line extender as well as a second set of contacts interposed between the output terminals and the subscriber's telephone set so connected and arranged that when the relay means is actuated, direct connection is made between the corresponding ring and tip lines with the line extender being isolated from the lines.

2. The combination as claimed in claim 1 in which the sets of contacts associated with the tip and ring lines are each in the form of a double-pole, double-throw switch in which the poles of the switch are connected to the lines and in which one pair of outside switch contacts are connected to the line extender terminals and the other pair of outside contacts are connected together to form a metallic by-pass around the line extender completely isolated from the terminals of the latter.

3. The combination as claimed in claim 1 in which the relay means is in the form of a relay having contacts arranged in the configuration of two double-pole, double-throw switches.

4. In a telephone circuit for connecting tip and ring lines from central office switching equipment, including a central office battery, to the tip and ring lines of a subscriber's telephone set to form a loop circuit, the combination comprising a line extender having a pair of input terminals providing connection to the central office tip and ring lines and a pair of output terminals providing connection to the tip and ring lines of the subscriber's telephone set, two sources of auxiliary direct voltage in the line extender, means in the line extender for detecting the polarity of the voltage of the central office battery and for automatically connecting one of the sources of auxiliary voltage into the loop in additive relation, relay means including contacts interposed between the line extender and the tip and ring lines so that when the relay is in one state and the line extender is connected in series with the lines and so that when the relay is in its opposite state corresponding lines are connected together to form a metallic by-pass around the line extender completely isolated from the terminals of the latter.

5. In a telephone circuit for connecting tip and ring lines from central office switching equipment, including a central office battery, to the tip and ring lines of a subscriber's telephone set to form a loop circuit, the combination comprising a line extender having a pair of input terminals providing connection to the central office tip and ring lines and a pair of output terminals providing connection to the tip and ring lines of the subscriber's telephone set, two sources of auxiliary direct voltage in the line extender, means in the line extender for detecting the polarity of the voltage of the central office battery and for automatically connecting one of the sources of auxiliary voltage into the loop in additive relation, magnetic relay means including contacts interposed between the terminals of the line extender and the tip and ring lines, the contacts being so connected and arranged that when the relay is in a first state the line extender is connected in series with the lines and so that when the relay is in its opposite state corresponding lines are connected together to form a metallic by-pass around the line extender completely isolated from the terminals of the latter, and a test set for providing a voltage to the magnetic relay for placing the contacts in their by-passing relation incident to the making of tests upon the tip and ring lines leading to the subscriber's telephone set.

6. In a telephone circuit for connecting tip and ring lines from central office switching equipment, including a central office battery, to the tip and ring lines of a subscriber's telephone set to form a loop circuit, the combination comprising a line extender having a pair of input terminals providing connection to the central office tip and ring lines and a pair of output terminals providing connection to the tip and ring lines of the subscriber's telephone set, two sources of auxiliary direct voltage in the line extender, means in the line extender for detecting the polarity of the voltage of the central office battery and for automatically connecting one of the sources of auxiliary voltage into the loop in additive relation, diversion relay means including contacts interposed between the line extender and the tip and ring lines so that when the relay is in its first state corresponding lines are connected together to form a metallic by-pass around the line extender completely isolated from the terminals of the latter thereby to provide a direct metallic connection to the subscriber's telephone set for conducting a ringing signal thereto and so that when the relay is in its opposite state the line extender is connected in series with the lines, and means responsive to the flow of direct current in the lines leading to the subscriber's telephone set resulting from the subscriber's lifting the receiver from the hook for placing the diversion relay in its opposite state so that the auxiliary voltage is added to the loop thereby to increase the current flow for more positive subsequent operation of the central office switching equipment.

7. The combination as claimed in claim 6 which includes overriding means for causing the relay to revert to its first state for the making of tests upon the tip and ring lines leading to the subscriber's telephone set.

8. In a telephone circuit for connecting tip and ring lines from central office switching equipment, including a central office battery, to the tip and ring lines of the subscriber's telephone set to form a loop circuit, the combination comprising a line extender having a pair of input terminals providing connection to the central office tip and ring lines and a pair of output terminals providing connection to the tip and ring lines of the subscriber's telephone set, two sources of auxiliary direct voltage in the line extender, means in the line extender for detecting the polarity of the voltage of the central office battery and for automatically connecting one of the sources of auxiliary voltage into the loop in additive relation, diversion relay means including contacts interposed between the terminals of the line extender and the tip and ring lines, the contacts being so connected and arranged that when the relay is in a first state corresponding lines are connected together to form a metallic by-pass around the line extender completely isolated from the terminals of the latter thereby to provide a direct metallic connection to the subscriber's telephone set for conducting a ringing signal thereto, the contacts being so arranged that when the relay is in its opposite state the line extender is connected in series with the lines, and means including current detecting relays in the tip and ring lines of the subscriber's telephone set for responding to the direct current flow resulting from the subscriber's lifting the receiver from the hook for placing the diversion relay in the opposite state so that the auxiliary voltage is added to the loop thereby to increase the current flow for more positive subsequent operation of the central office switching equipment, the current detecting relays having an associated "or" gate for coupling the same to the diversion relay so that flow of current in either of the current detecting relays is effective to operate the diversion relay.

9. The combination as claimed in claim 8 in which the current detecting relay is in the form of a light emitting diode having a photocell with the photocell being connected in controlling relation to the diversion relay.

10. The combination as claimed in claim 8 in which means are provided for overridingly placing the diversion relay in its first state for the making of tests upon the subscriber's tip and ring lines when the subscriber's receiver is removed from the hook.

11. The combination as claimed in claim 8 in which means are provided for holding the diversion relay in the state corresponding to conduction in the loop during sudden reversal of polarity of the central office battery.

* * * * *